United States Patent [19]

Obara

[11] Patent Number: 4,771,335

[45] Date of Patent: Sep. 13, 1988

[54] METHOD AND APPARATUS FOR SENDING DATA

[75] Inventor: Keiichi Obara, Hachioji, Japan

[73] Assignee: Kabushiki Kaisha Toshiba, Japan

[21] Appl. No.: 883,767

[22] Filed: Jul. 9, 1986

[30] Foreign Application Priority Data

Aug. 26, 1985 [JP] Japan ................................ 60-187118

[51] Int. Cl.$^4$ ............................................... H04N 1/42
[52] U.S. Cl. ..................................... 358/258; 358/280
[58] Field of Search .............. 358/256, 260, 258, 257, 358/280; 375/3, 5, 7, 8; 370/53, 58, 61, 77

[56] References Cited

U.S. PATENT DOCUMENTS

| 4,058,672 | 11/1977 | Crager | 358/257 |
| 4,345,276 | 8/1982 | Colomb | 358/258 |
| 4,419,697 | 12/1983 | Wada | 358/258 |

OTHER PUBLICATIONS

Teramura, et al; Experimental Fascimile Communication System on Packet Switched Data Network, IEEE Trans. on Comm. vol. COM-29, No.12, Dec. 1981, pp. 1942-1951.
Matsuo et al, Development of Facsimile Communication System for Packet Switched Data Network, 1981 Conference on Comm. 14-18 Jun. 1981, pp. 44.1-44.7, Ikeda, Study on Video Switching System, Review of Elec. Comm. Labs. vol. 25, No. 1-2, pp. 1-8, Jan.-Feb. 1977.

Primary Examiner—Michael A. Masinick
Attorney, Agent, or Firm—Banner, Birch, McKie & Beckett

[57] ABSTRACT

A communication system which includes two digital terminal stations connected to each other by a digital communication line. The communication system includes data terminals adapted for operation on an analog communication line which transmits main data and control data. The data terminal has two modems for transmitting respective data. Correspondingly, the digital terminal station has two modems which modulate and demodulate the respective data signal for transmitting the data from the digital communication line through the analog communication line and vice versa. The data transmission between two data terminals through the digital terminal stations is completed in one transmission call.

7 Claims, 8 Drawing Sheets

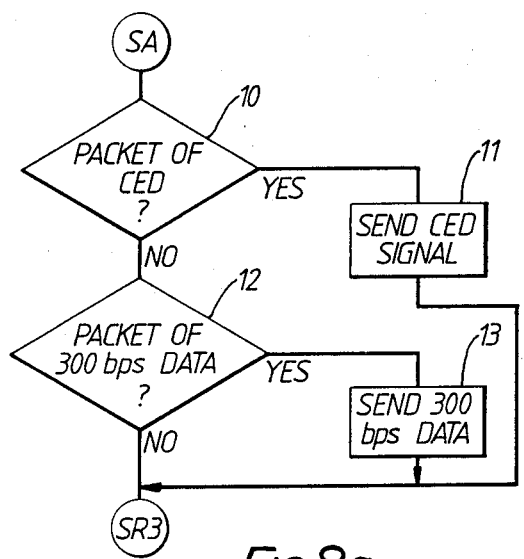
FIG.8a.
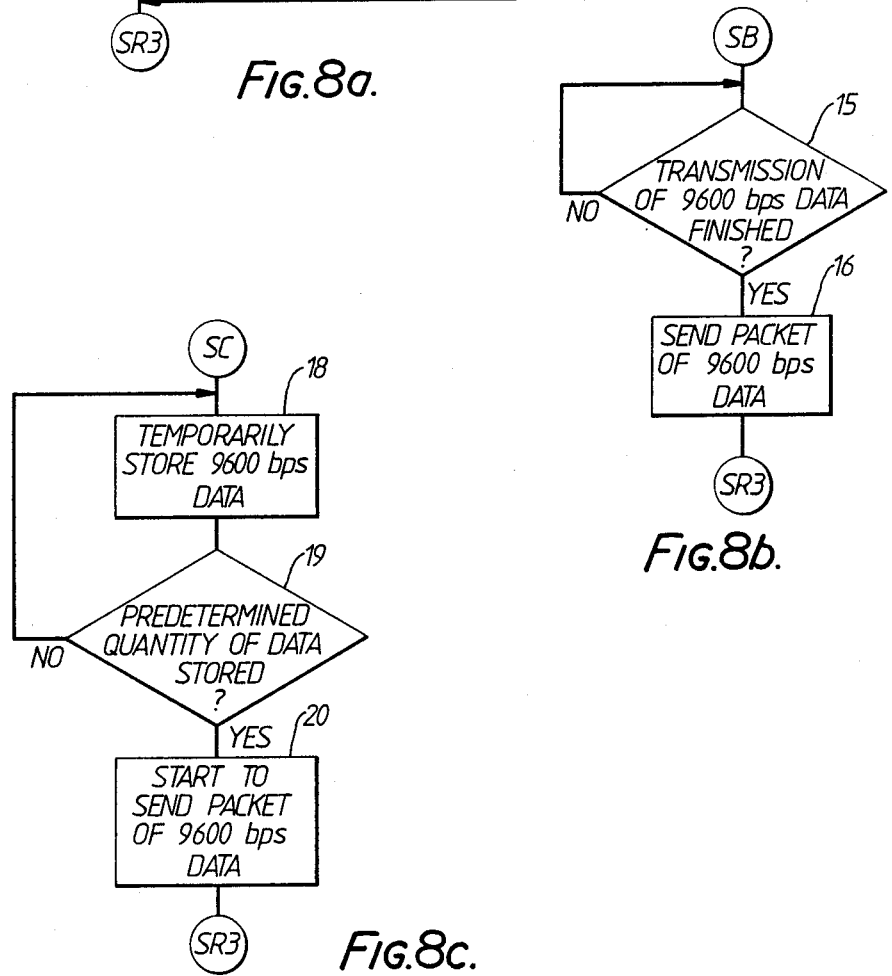
FIG.8b.
FIG.8c.

METHOD AND APPARATUS FOR SENDING DATA

BACKGROUND OF THE INVENTION

This invention relates to a communication system, and more particularly relates to a communication system in which a data terminal adapted to an analog communication line is connected to a digital communication system.

In a data terminal, such as a facsimile apparatus, which needs to identify, to supervise and to control data transmission according to a designated protocol, data transmission is performed using not only a main channel but also a sub-channel. The latter is used for transmission of code data i.e., a hand shake protocol, whereas the former is used for transmission of primary data.

Analog communication systems have been dominant for public and leased lines, and have been developed mainly for telephone communications. Data terminals or data transmitting apparatus have also been developed and adapted for analog transmission even though digital data process techniques are fully used for their circuitry.

More developments will be made in digital communications systems in the future and such systems will play a greater role in the communication of information. However, for the time being, communication systems will continue to be used with data terminals adapted to analog communication lines and which have partially been adapted to digital communication systems by means of a suitable adapter. In fact, there is a great demand to adapt analog line data terminals to data terminals which can be used in a mixed communication system. This is so mainly because digital communication lines are cheaper and have a higher quality than analog communication lines. Moreover, data terminals for digital lines are not as popular as those for analog lines.

There have been several attempts in the prior art to adapt facsimile apparatus for use with analog communication lines so that they can be used with digital communication lines. FIG. 1 shows one such facsimile communication system. In FIG. 1, two digital terminal stations 1 and 2 are connected to each other by digital communication line 3. Two facsimile apparatuses 4 and 5 are connected to respective digital terminal stations by analog communication lines 6 and 7. Facsimile apparatus 4 and 5 are apparatus for facsimile transmission over a conventional switch telephone network which use a band-width between 0.3 kHz and 3.4 kHz. Such networks are capable of transmitting facsimile message data at a signaling rate of of 9600 bps and binary coded information at a signalling rate of 300 bps for example. Digital terminal stations 1 and 2 operate to change the signalling method for call establishment and call release between the analog communication line and the digital communication line. They also operate to convert analog signals to digital signals by code modulation and vice versa. The length of analog communication lines 6 and 7 is relatively short and the length of digital communication line 3 is relatively long. In this system, after call establishment facsimile transmission is performed in real time. In a facsimile call, one facsimile apparatus can transmit facsimile message data to the other at a data signalling rate of 9600 bps, each exchanging binary coded information at 300 bps.

In this way, the facsimile apparatus for an analog communication line is able to be adapted to a digital communication line. However, in such a system, it is difficult to make much use of the benefit of low communication line cost because a high data signalling rate is required. A data signalling rate of 64K bps is required to modulate a 3.4K Hz analog signal in PCM, in the case where the sampling frequency is 4K Hz and the number of quantum steps is 128. If ADMCM (Adaptive Differential Pulse Code Modulation) is utilized for the above modulation, the data signalling rate can be reduced. However, it can only be reduced to 32K bps at a minimum.

FIG. 2 shows another conventional facsimile communication system. In this system, message storing apparatus 8 and 9 are provided within digital terminal stations 1 and 2. Message storing apparatus 8 and 9 correspond to a facsimile apparatus from which the scanning unit, the printing unit and the associated components are eliminated and to which a memory of large-sized capacity is added. Facsimile transmissions between facsimile apparatus 4 and facsimile apparatus 5 is performed through three transmission calls. First, facsimile apparatus 4 originates a transmission call (first call) into analog communication line 6 designating facsimile apparatus 5. Message storing apparatus 8 then operates as a facsimile receiver and receives the facsimile message data from facsimile apparatus 4 and an exchange of binary coded information between the two takes place. Facsimile apparatus 4 then sends its facsimile message data to message storing apparatus 8. Message storing apparatus 8 then stores the received message data and an address signal transmitted from facsimile apparatus 4 so as to designate facsimile apparatus 5. However, message storage apparatus 8 does not store binary coded information exchanged during its receiving operation. Next, digital terminal station 1 originates a transmission call (second call) to digital terminal station 2 to transfer the formerly received message data and the address signal. In this transmission call, it is only necessary that the data be transferred in the manner of a so called "file transfer." Therefore, there is no need to produce facsimile binary coded information in this second transmission call through the digital communication line. The transferred message data and the address data are stored in message storing apparatus 9. The data signalling rate is free from that of the facsimile message transmission. It is only dependent on the rate of the digital communication line. After completion of the second call, message storing apparatus 9 originates a transmission call (third call) to facsimile apparatus 5 according to the received address signal. Facsimile apparatus 5 thus operates as a facsimile transmitter. Facsimile apparatus 5 forms the required binary coded information to communicate with facsimile apparatus 5 then transmits the message data to facsimile apparatus 5 at the data signalling rate of 9600 bps.

As described above, it is possible to connect a data terminal adapted for an analog communication line to a digital communication system by use of a storage apparatus. As mentioned above, however, a plurality of transmission calls must be made for one transmission call from one end to the other end. Thus, real time operation is not possible and a user is not able to confirm completion of a data transmission to the ultimate designation. Moreover, such a system requires sophisticated digital processing equipment and a memory having a large capacity for storage of message data. Such systems are required to process data transmission procedure almost the same as that of a data terminal.

SUMMARY OF THE INVENTION

It is, therefore, an object of the present invention to provide a communication system comprising a digital communication system and data terminals for an analog communication line connected to a digital communication system which is capable of transmitting data in real time and at a low data signalling rate.

It is another object of the present invention to provide a method in a communication system in which a data transmission is completed in every transmission call and which requires a lower data signalling rate.

It is a further object of the present invention to realize the above-mentioned objects and advantages with a system which is reliable in operation and simple in construction.

According to the present invention and in order to realize the above objects, a communication system is provided in which two digital terminal stations are connected to each other by digital communication lines and data terminals are connected to respective ones of the digital stations by respective analog communication lines. Two or more modems are provided in the digital terminal stations which modulate and/or demodulate so as to transmit main data and the data for transmission procedure between the data terminals separately. A digital transmitter is also provided in the digital terminal station so as to transmit the main data and the data for transmission procedure between two data terminals separately with no modification of the data.

BRIEF DESCRIPTION OF THE DRAWINGS

FIGS. 7, 8 and 9 illustrate flow charts which describe the operation of CPU 111 shown in FIG. 4 under various modes of operation.

DETAILED DESCRIPTION OF THE PREFERRED EMBODIMENTS

Figure 1:
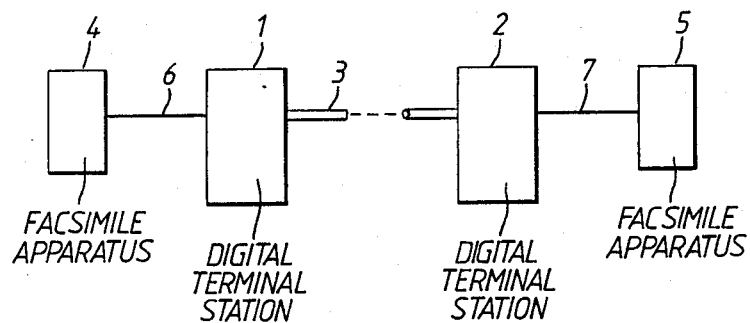
FIG. 1 shows a conventional communication system in block diagram form.
Figure 2:
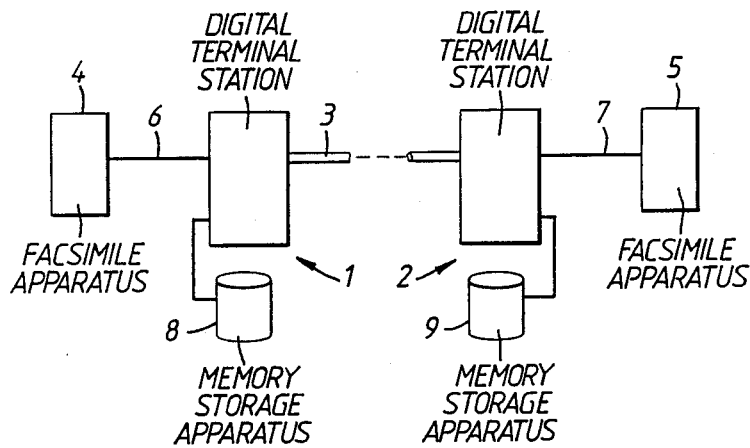
FIG. 2 shows another conventional communication system in block diagram form.
Figure 3:
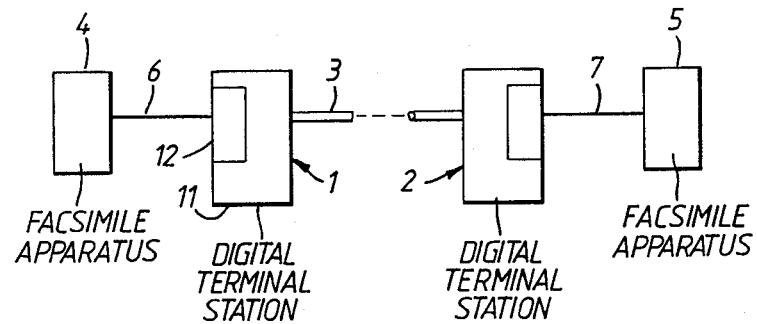
FIG. 3 shows a first embodiment of the invention in block diagram form.

As shown in FIG. 3, a communication system in accordance with the present invention basically includes two digital terminal stations 1 and 2, a digital communication line 3, two data terminals 4 and 5, and two analog communication lines 6 and 7. Digital terminal stations 1 and 2 are the terminal stations of the digital communication line. The digital communication line is a packet switch network, for example, which serves as a public data network. The exchange within the network for switching is not shown. Data terminals 4 and 5 are the facsimile apparatus in an embodiment which satisfies the standard according to the CCITT (International Telephone and Telegraph Consultative Committee) recommendation T.4 and T.30. Each of the analog communication lines 6 and 7 is merely a pair of metallic lines in this embodiment. Lines 6 and 7 may also be an analog communication line which includes an exchange for switching. Digital terminal stations 1 and 2 are connected to each other by digital communication line 3 and to facsimile apparatus 4 and 5 by analog communication lines 6 and 7, respectively. Terminal stations 1 and 2 function to establish and to release transmission calls, to transmit data in digital signal form and to transfer information concerning establishment and release of a call from and to respective facsimile apparatus 4 and 5.

Figure 4:
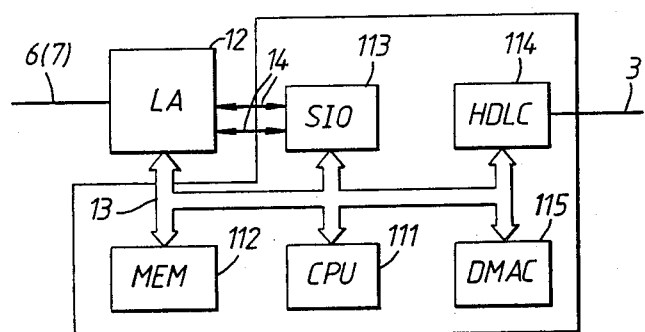
FIG. 4 shows digital terminal stations 1 or 2 shown in FIG. 3.
Figure 5:
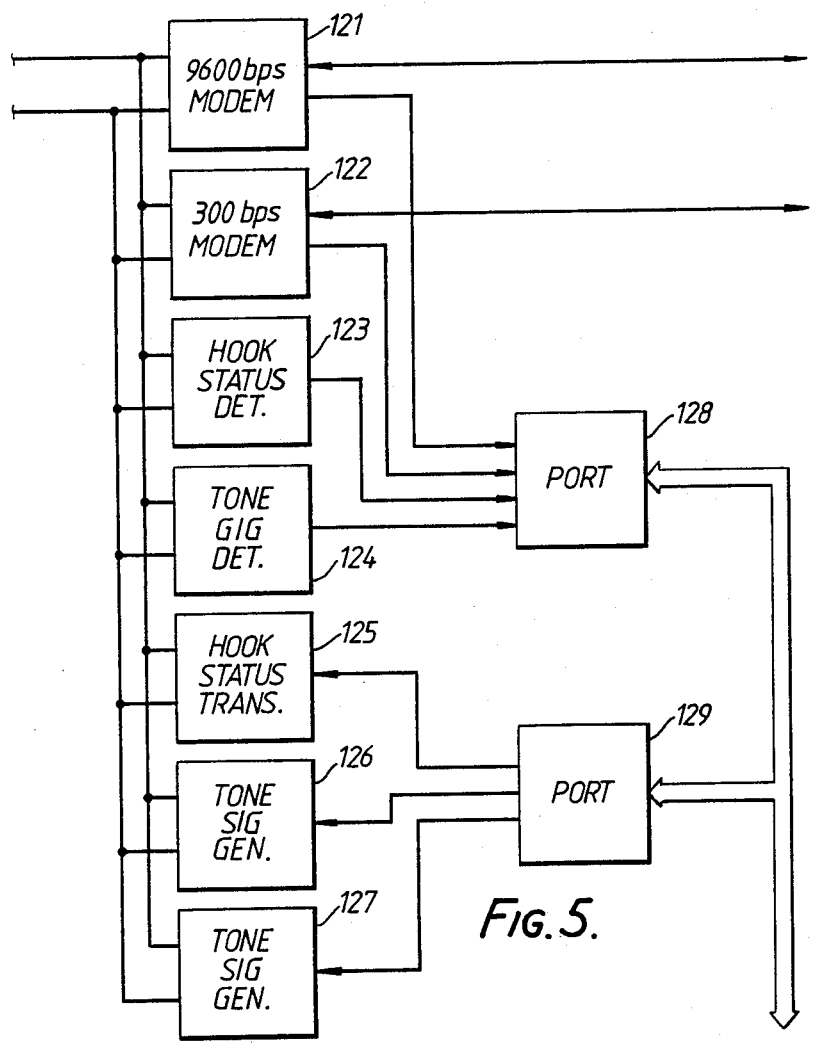
FIG. 5 shows analog line adapter 12 shown in FIG. 3 or FIG. 4 in detail.

As shown in FIG. 4, each of digital terminal stations 1 and 2 includes digital line adapter 11 and analog line adapter 12 which are connected to each other by bus 13 and data line 14. Digital line adapter 11 is a packet multiplexer. Analog line adapter 12, as shown in FIG. 5, includes 9600 bps modem 121, 300 bps modem 122, hook status detecting circuit 123, tone signal detecting circuit 124, hook status transferring unit 125, tone signal generating circuit 126 and 127, I/O port 128 and 129. The 9600 bps modem 121 and 300 bps modem 122 are identical to those of the facsimile apparatus. They demodulate analog-modulated signals from the facsimile apparatus and transfer demodulated signals, that is base band data, to digital adapter 11. They also modulate and transmit respective data received from digital line adapter 11 to the facsimile apparatus. Their receiving status representing arrival of data is provided to I/O port 128 so as to be used by digital line adapter 11.

Hook status detecting circuit 123 detects the hook status of the facsimile apparatus in the manner of detecting the loop current of an analog communication line, for example. The detection result is provided to port 128.

Tone signal detecting circuit 124 detects specific tone signals to be received from the facsimile apparatus. The detection result is also provide to port 128. Port 129 receives the several commands from digital line adapter 11 and stores them. Hook status transferring circuit 125 transfers not only the hook status of the other party's facsimile apparatus but also the ringing signal according to the command. It includes a direct current power source for the analog communication line and a ringing signal source (not shown).

Tone signal generating circuit 126 generates a busy-tone as required by the command. Another tone signal generating circuit 127 generates specific tone signals to be transmitted to the facsimile apparatus. It should be understood that two modems 121 and 122 specific are to this invention whereas tone signal detecting circuit 124 and tone signal generating circuit 127 are specific to the facsimile apparatus and hook status detecting circuit 123, hook status transferring circuit 125 and tone signal generating circuit 126 are specific to the type and manner of the analog communication line.

Referring to FIG. 4 again, digital line adapter 11 includes CPU 111, memory 112, serial I/O port 113, HDLC (High-level Data Link Control) unit 114 and DMA (Direct Memory Access) controller 115. Serial I/O port 113 continuously transfers the data to and from 9600 bps modem 121 and 300 bps modem 122 in serial form. HDLC unit 114 assembles the data into a digital packet and sends it out to digital communication line 3, HDLC unit 114 also disassembles packets received from the other digital terminal adapter under the control of CPU 111. The method of assemblage and disassemblage is based on the X.25 standard, established by the CCITT for example. According to this standard, a series of data is divided into a plurality of blocks each of which is composed of a designated number of words for example, 256 octets. Control information, i.e., called a header, necessary to transfer the data is added to each block of data. This block of data with the control information is called a "packet". The control information includes the address information and frame error check sequence information and so forth. In this embodiment, it further includes an identifier which identifies the type of data, i.e., 9600 bps data, 300 bps data and tone signal data. The 9600 bps data and 300 bps data are transferred between HDLC unit 114 and memory 112 as controlled by DMA controller 115. DMA controller 115 also controls the transfer of data between memory 112 and serial I/O port 113. The above-mentioned control information is transferred between HDLC unit 114 and CPU 111 under the control of CPU 111. CPU 111 executes a program for control of the digital terminal station including the above-described control. Memory 112 stores the program and temporarily stores control data necessary for operation of CPU 111, and the 9600 bps data and 300 bps data.

Figure 6:
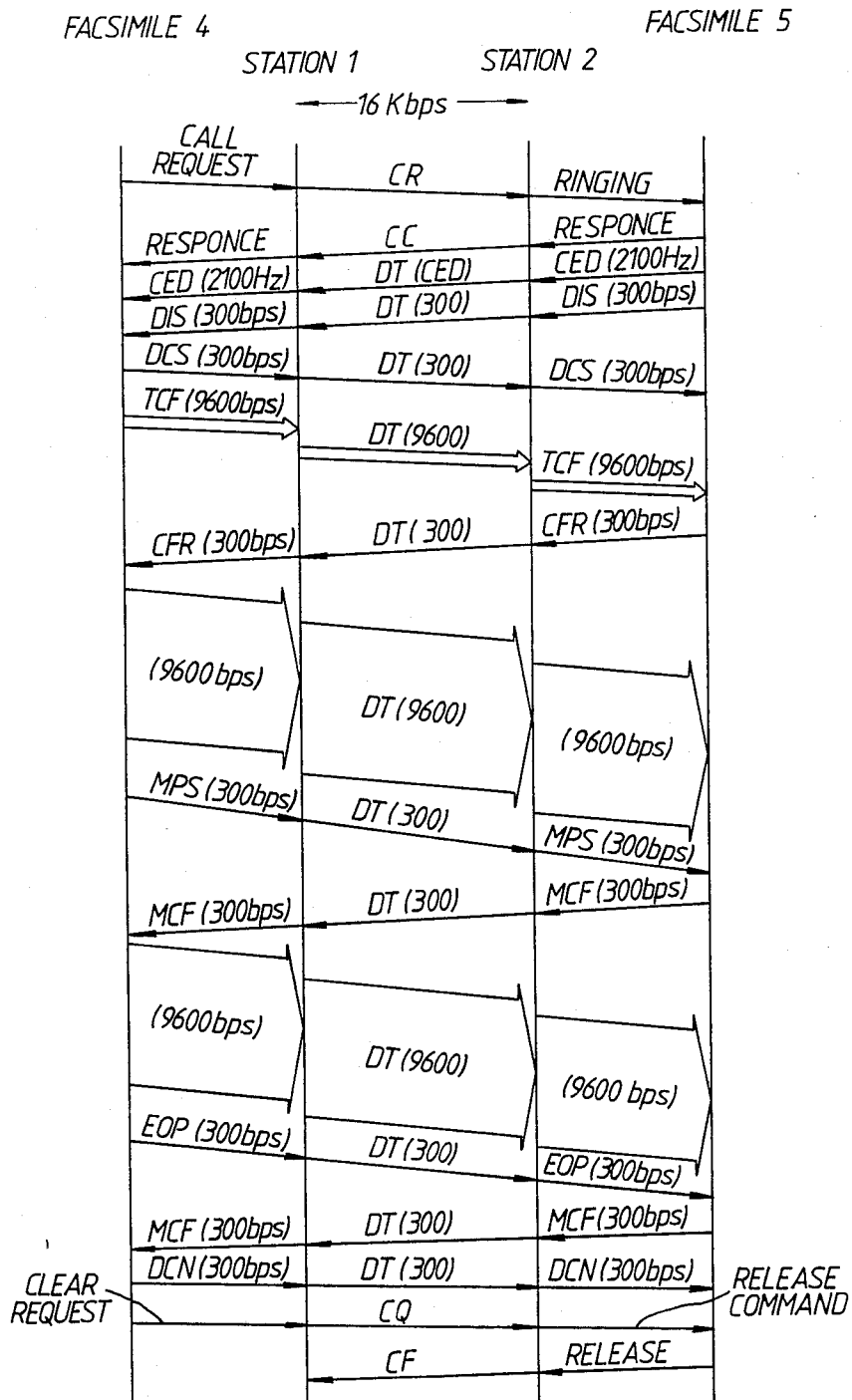
FIG. 6 shows a sequence of facsimile transmissions in accordance with the embodiment of the invention shown in FIG. 3.

FIG. 6 describes the operation of the facsimile apparatus and the digital terminal station. More particularly, FIG. 6 shows the operation between facsimile apparatus 4 and digital terminal station 1 (on the left), between digital terminal stations 1 and 2 (in the middle) and between digital terminal station 2 and facsimile apparatus 5 (on the right). Each facsimile apparatus 4 and 5 operates in accordance with the CCITT recommendation T.30. Facsimile apparatus 4 and 5 operate as transmitter and receiver, respectively.

Figure 7:
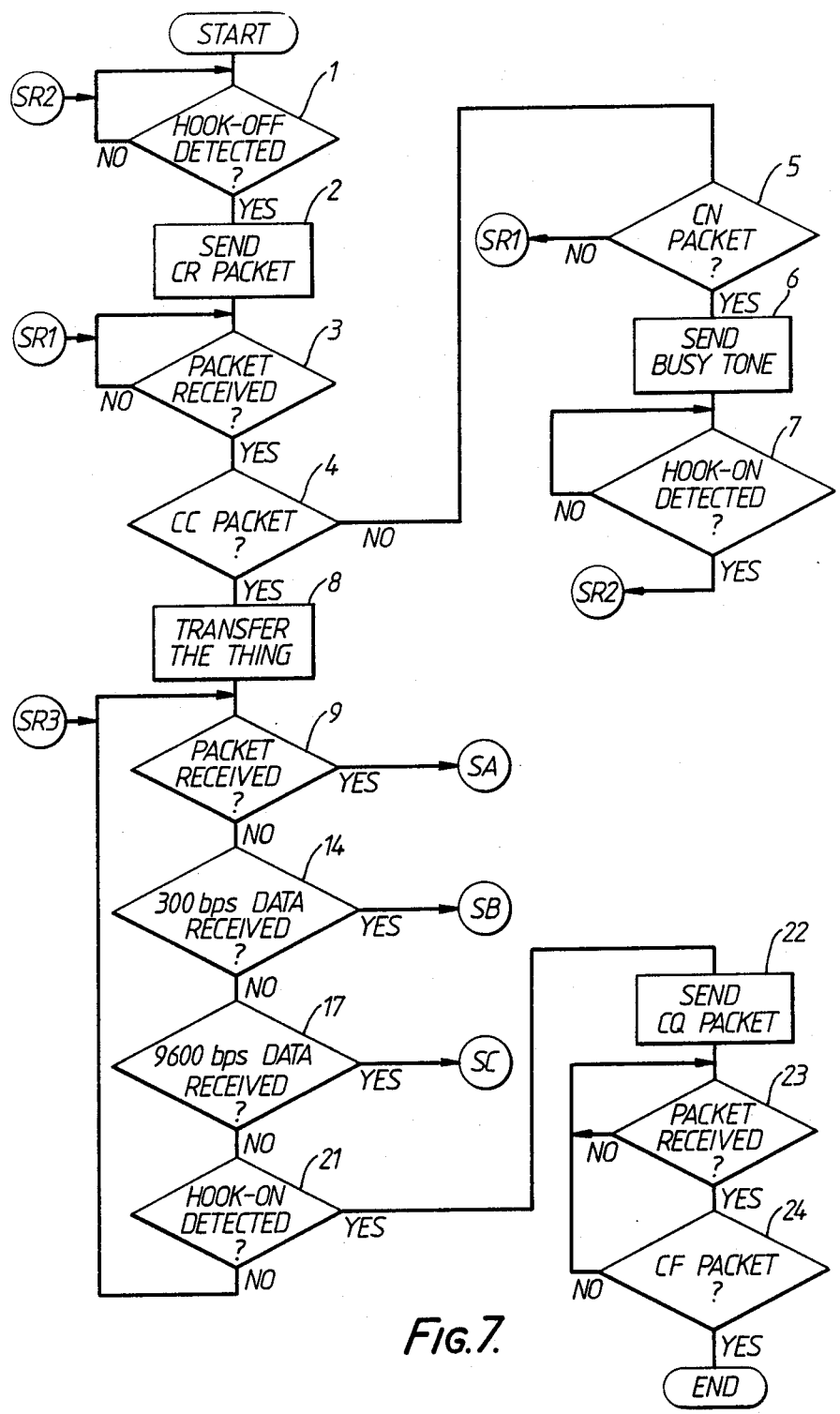
Figure 9:
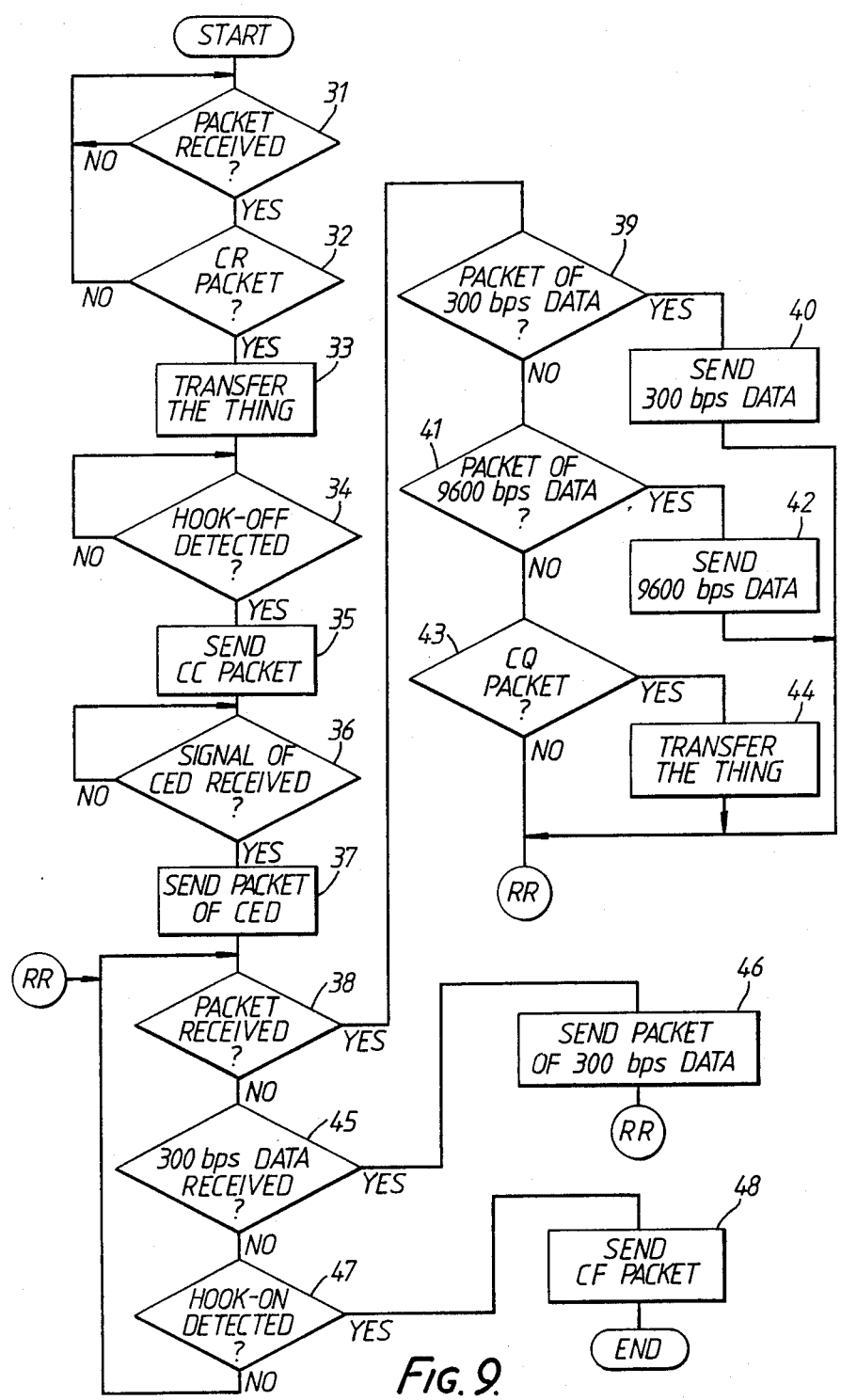

FIGS. 7 through FIG. 9 are flow charts which show the operation of CPU 111 of the digital terminal stations. Digital terminal station 1, which serves as a transmitter in this instance, executes a program illustrates by the flowchart shown in FIG. 7 and FIG. 8 whereas digital terminal station 2, which serves as a receiver, executes a program illustrated by the flow chart shown in FIG. 9. The code of every component is indicated by a T and an R as required to represent transmitter and receiver, respectively. If the user managing facsimile apparatus 4 activates the hook switch (not shown) to an onstate to originate a facsimile transmission call, the changed hook status is detected by hook status detecting circuit 123T of analog line adapter 12T. The status information is provided to I/O port 128T. CPU 111 cyclicly observes the hook status by checking I/O port 128 and observes whether the reception of a packet has occurred. CPU 111T recognizes the change of hook status at step 1 and has HDLC unit 114T send a CR (Call Request) packet which represents the origination of a digital transmission call (step 2). CPU 111R recognizes the reception of the CR packet (step 31, 32) and then sends a command to I/O port 129R so as to cause hook status transferring circuit 125R to send a signal (step 33). It is assumed that facsimile apparatus 5 is set to be ready to respond to the call automatically. The response of facsimile apparatus 5 is detected by hook status detecting circuit 123R. The detected result is provided to I/O port 128R. CPU 111R recognizes this at step 34 and then makes HDLC unit 114R send a CC (Call Connected) packet (step 35). CPU 111T notices the reception of the CC packet through HDLC unit 114T (step 3,4) and causes hook status transferring circuit 125T to transfer the packet to facsimile apparatus 4 (step 8) in the manner of changing the sign of the direct current power source. In this way, the sequence of call establishment is completed. If facsimile apparatus 5 is not set to be ready to respond automatically and it does not respond within a predetermined period, CPU 111R would cause HDLC unit 114R to send a CN (incoming Call) packet (this step is not shown). In that case, CPU 111T would execute step 3 through 7. When facsimile apparatus 5 responds, it sends a CED 2100 Hz tone signal for a predetermined time as a "called station identification." CPU 111R recognizes the arrival of the "called station identification" through the operation of tone signal detecting circuit 124R and causes HDLC unit 114R to send a DT (DTE (Digital Terminal Equipment) data) packet (step 36, 37). The DT packet includes the control flag in its control field. The control flag, which is formed by CPU 111 as part of the control data, represents that this DT packet is a CED signal. CPU 111T receives this control data through HDLC unit 114T and recognizes that it is a CED signal (Step 9, 10). CPU 111T then causes tone signal generating circuit 127T to generate a 2100 Hz tone signal for three seconds (step 11). Facsimile apparatus 5 then sends DIS signal (Digital Identification Signal) using a 300 bps modem. In digital terminal station 2, 300 bps modem 122R informs I/O port 128R of reception of the 300 bps data, whereby CPU 111R recognizes it (step 14). The data resulting from demodulation in 300 bps modem 122R is provided to HDLC unit 114R through serial I/O port 113R and memory 112R after CPU 111R causes HDLC unit 114R to send out the DT packet (step 46). The control flag represents that the DT packet includes the data in the data field which is received by 300 bps modem 122R. In digital terminal station 1, HDLC unit 114T extracts the control data, causing CPU 111T to recognize the reception of data concerning the 300 bps modem (step 9, 10 and 12). CPU 111T then causes DMA controller 115T to transfer the data, which is next extracted by HDLC unit 114T, to 300 bps modem 122T through memory 112T. The signal resulting from modulation in 300 bps modem 122T is then sent out (step 13).

A DCS (Digital Command Signal) is next transferred from facsimile apparatus 4 to facsimile apparatus 5. The operation of each of the digital terminal stations in the DCS mode is the same as described above except that the direction of each of the signal paths is reversed. The following are the steps each CPU executes which respect to DCS. CPU 111T; (SR3), 9, 14, (SB), 15, 16 and (SR3) CPU 111R: (RR), 38, 39, 40 and (RR). Step 15, which has special significance as described below is substantially neglected in the above steps because of the absence of 9600 bps data.

After sending the DCS, facsimile apparatus 1 sends a TCF (Training Check). The operation of each digital terminal station in the TCF mode is set forth in the following flow chart steps:

CPU 111T: (SR3), 9, 14, 17, (SC), 18, 19, 20 and (SR3)

CPU 111R: (RR), 38, 39, 41, 42 and (RR)

Steps 18 and 19 are provided for the purpose of preventing message transmission from being interrupted as described below. Furthermore, the control flag, which is formed by CPU 111T, represents that the then DT packet includes the data in the data field which is received by 9600 bps modem 121T.

A CFR (Confirmation to Receive) signal is next transferred from facsimile apparatus 5 to facsimile apparatus 4. The operation of each digital terminal station in this mode is exactly the same as that in the above-described DIS transmission mode.

After the CFR transmission, the facsimile message transmission is started. The message transmission is done using the 9600 bps modem. Therefore, the operation of each digital terminal station is the same as that in the above described TCF transmission mode.

The purpose of steps 18 and 19 will now be described. To begin with, the facsimile transmitter and the digital terminal stations operate on the basis of independent clocks. While the data signalling rate of the facsimile is regulated, there is an acceptable error range. With respect to the clock for the digital communication line, there is also an acceptable error range. If the facsimile receiver is directly connected to the transmitter, it operates on the basis of a reproduced clock signal in synchronism with the clock of the transmitter. In the case where a digital communication system is interposed between the facsimile transmitter and the receiver, the modem at the receiving side of the digital terminal stations operates on the basis of the clock of the digital communication system, whereby the facsimile receiver operates on the basis of a reproduced clock in synchronism with the digital communication system. Thus, there will be a difference between the operation of the clocks of the facsimile transmitter and the receiver.

The data to be received in the facsimile receiver, especially message data, has to be prevented from being interrupted. The message data is a series of lines of data which are composed of a series of variable length code words. If it is interrupted at any position, the facsimile receiver no longer can decode the data to reproduce scanned line data. Interruption may result from the existence of a difference between the transmission clock and the facsimile receiver clock such that the facsimile receiver clock is higher than the facsimile transmitter clock.

In order to prevent this interruption, steps 18 and 19 are provided in this embodiment of the invention by which the start of a message transmission towards the receiver is obliged to wait for a small delay while the facsimile transmitter continues transmitting. The length of this wait should be such that an interruption never occurs even in the worst case where the clock of the digital communication system is at its highest in the acceptable error range and the clock of the facsimile (transmitter) is at its lowest. The length of the series of message data depends on the contents of the document to be sent. However, it is desired to have an adequate safety margin for a standard document.

The data signalling rate of the digital communication line is distinguished from the net data signalling rate as to data to be transmitted between two facsimile apparatus. Although about 12Kbps is high enough to transmit 9600 bps facsimile message data in addition to the required control data (header), in this embodiment a data signalling rate of 16 Kbps is utilized partly because it is more popular. Without restricting the transmission of packets for the message data, the transmission of every packet is performed at the rate of 16 Kbps as shown in FIG. 6. This rate is one half of the rate for a conventional system.

When facsimile apparatus 4 finishes the transmission of message data, it sends a MPS (Multi-Page Signal) to the other facsimile apparatus. The other facsimile apparatus 5 sends a MCF (Message Confirmation) signal. Facsimile apparatus 4 transmits other message data corresponding to another facsimile document. Moreover, it sends an EOP (End Of Procedure) signal. Finally, it sends a DCN (Disconnect) signal after the other facsimile apparatus responds to the EOP signal by sending a MCF signal. In the above sequence, the operation of each digital terminal station in every transmission is the same as that in case of DCS, DIS and message data.

Step 15, which is executed by CPU 111T to send packets of 300 bps data, is provided for the purpose of controlling the order of sending packets. As described above, 9600 bps data is temporarily stored in the digital terminal station for prevention of 9600 bps data interruption. The facsimile transmitter transmits a MPS signal or a EOP signal before message data is received, it can no longer execute the right procedure, thereby resulting in disorder of the procedure and incomplete printing. In order to prevent this occurrence of disorder, 300 bps data is transmitted after 9600 bps data is completely transmitted. In this way the facsimile procedure is completed.

Finally, the call release procedure is executed. In facsimile apparatus 4, the line relay is caused to break the loop of the analog communication line. Hook status detecting circuit 123T detects this break. CPU 111T recognizes it and causes HDLC unit 114T to send a CQ (Clear Request) packet (step 21, 22). CPU 111R, causes hook status transferring circuit 125R to transfer the hook status of the transmitting side (step 38, 39, 41, 43 and 44) and to cause HDLC unit 114R to send a CF (DTE clear confirmation) packet when facsimile apparatus 5 is actually disconnected (step 47 and 48). Then CPU 111R ends its execution. CPU 111T also ends after the recognition of reception of a CF packet (steps 23 and 24).

As described above, according to this embodiment, the data signalling rate for facsimile transmission in a digital communication line is required to be about 12 or 16 Kbps. It is markedly reduced in comparison with conventional systems. Moreover, it is made sure that the facsimile transmission from one end to the other end is completed in one transmission call, whereby confirmation of the transmission can be confirmed. The digital terminal station only has to send or deliver the data from one side to the other side, without transforming the data, resulting in simplification of the structure of circuitry. In the foregoing description, steps 18, 19 and 15 from the transmitting control flow may be transferred to the receiving control flow.

Figure 10:
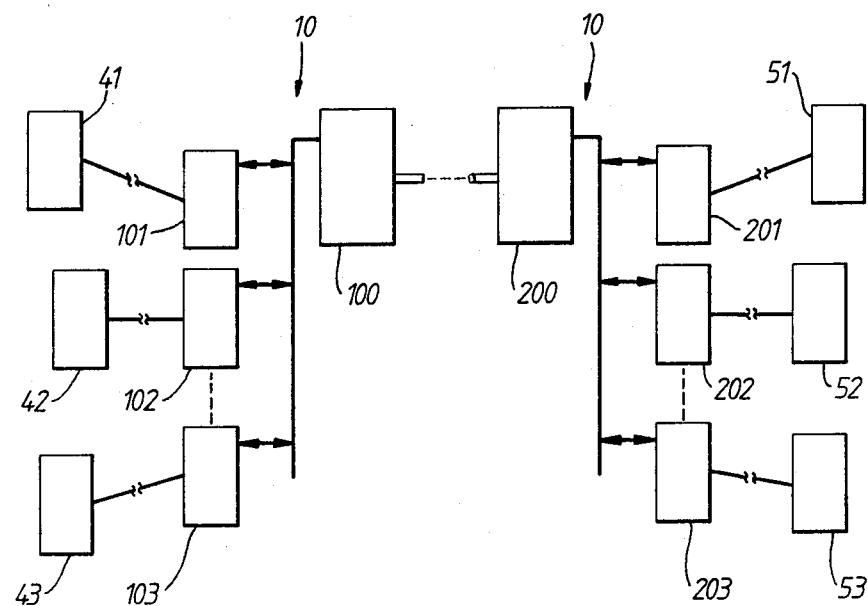
FIG. 10 shows a second embodiment of the present invention in block diagram form.

FIG. 10 shows a second embodiment of the present invention. In this embodiment, two groups of data terminals 41, 42 and 43, and 51, 52 and 53, such as facsimile apparatus, are commonly connected to digital terminal stations 10 and 20, respectively. However, digital terminal stations 10 and 20 includes multiplexer 100 and 200, and a plurality of terminal adapters 101, 102 and 103, and 201, 202 and 203, respectively, each of which is provided for each data terminal 41 through 53. Each terminal adapter 41 through 53 is the same as digital terminal station 1 described above even though the analog line adapter may be modified in accordance with the type of data terminal used. Multiplexers 100 and 200 multiplex and demultiplex the data from the respective terminal adapters.

Figure 11:
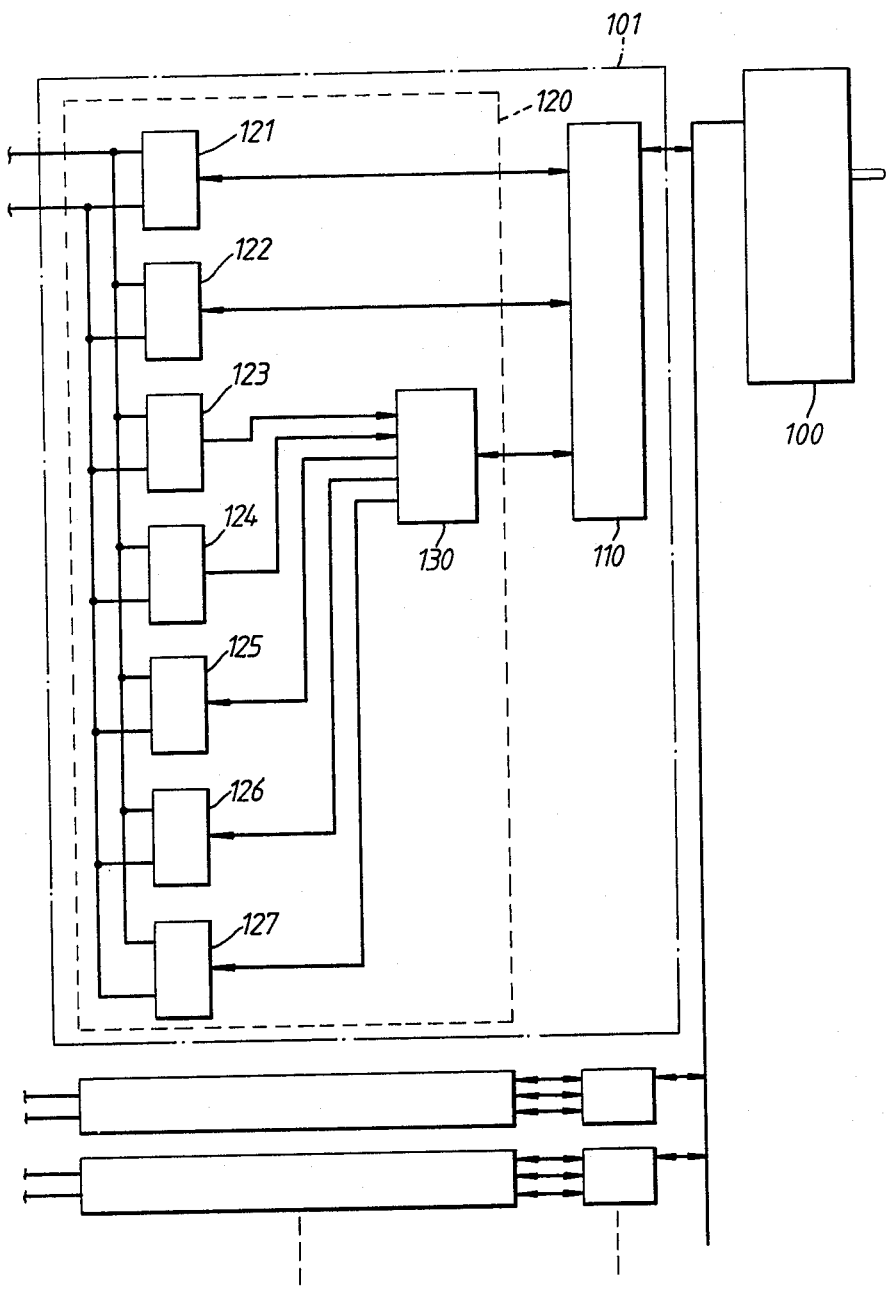
FIG. 11 shows a third embodiment of the present invention in block diagram form.

FIG. 11 shows a third embodiment of the present invention. Contrarily to the second embodiment, time division multiplexers 110 are utilized as the digital line adapting portion of each terminal adapter 101. Control data codes 130 of analog line adapting portion 120 encodes the data concerning to hook status detecting circuit 123 and tone signal detecting circuit 124, and decodes the data for hook status transferring circuit 125, tone signal generating circuit 126 and 127. This data is multiplexed together with 9600 bps data and 300 bps data in a time division manner by time division multiplexer 110. Each data train is further multiplied altogether by multiplexer 100.

Thus, in accordance with the last two embodiments of the present invention, the efficiency of transmission can further be made higher.

There is also a conventional digital communication line having a data signalling rate of 48 Kbps. As mentioned above, approximately 12 Kbps is sufficient to transmit facsimile data. Thus, where 48 K bps is used, four data terminals can be used.

While in the foregoing specification, a few embodiments of the invention have been set forth for purposes of making a complete disclosure, it will be apparent to those skilled in the art that numerous changes may be made without departing from the spirit and principles of the invention.

I claim:

1. In a communication system for transmitting and receiving data signals, said system having first and second digital terminal stations connected to each other by digital communication lines and first and second data terminals connected to said first and second digital terminal stations by first and second analog communication lines, respectively, a method comprising the steps of:
   providing said first digital terminal with a first modulator having a predetermined data signaling rate;
   providing said first digital terminal station with first digital transceiver means and a first demodulator capable of synchronizing its data signaling rate with the data signaling rate of said first modulator;
   providing said second digital terminal station with second digital transceiver means and a second modulator having the same data signaling rate as that of said first modulator;
   providing said second data terminal with a second demodulator capable of synchronizing its data signaling rate with the data signaling rate of said second modulator of said second digital terminal station;
   originating at either said first data terminal or said second data terminal a data transmission call;
   establishing a communication link between said first data terminal and said second data terminal through said first and second digital terminal stations;
   transmitting a series of data signals by said first modulator from said first data terminal to said first digital terminal station during said data transmission call;
   receiving by said first demodulator the data signals from said first digital terminal;
   said first digital transceiver means transmitting the data signals from said first digital terminal station to said second digital terminal station during said data transmission call;
   receiving by said second digital transceiver means the data signals from said first digital transceiver means; and
   transmitting the data signals from said second digital terminal station by said second modulator to said second data terminal during said data transmission call.

2. The method of claim 1 further comprising determining the length of data signals to be stored based on the difference of the maximum and minimum data signaling rates within a predetermined range about the nominal data signaling rate of said modulators.

3. The method of claim 1 wherein at least one of said steps of transmitting from said first digital terminal station and transmitting from said second digital terminal station includes the steps of storing a predetermined portion of said series of data signals and transmitting said series of data signals thereafter.

4. A data communication system, said system comprising:
   a digital communication line;
   a first and second analog communication line;
   a first facsimile apparatus connected to said first analog communication line and having first modem means for transmitting facsimile message data at a first data signaling rate and second modem means for transmitting and receiving facsimile control data at said first data signaling rate in one facsimile call;
   a first digital terminal station connected between said first analog communication line and said digital communication line and having third modem means for receiving said facsimile message data from said first facsimile apparatus, fourth modem means for transmitting and receiving facsimile control data to and from said first facsimile apparatus and digital transmitting means for transmitting the received facsimile message data and facsimile control data through said digital communication line and receiving data incoming through said digital communication line during said one facsimile call;
   a second digital terminal station connected between said second analog communication line and said digital communication line and having digital transmitting means for transmitting facsimile message data and facsimile control data through said digital communication line and receiving facsimile message data incoming through said digital communication line, fifth modem means for transmitting facsimile message data to said second analog communication line, sixth modem means for transmitting and receiving facsimile control data to and from said second analog communication line;
   a second facsimile apparatus connected to said second analog communication line and having seventh modem means for said second analog communication line for receiving facsimile message data incoming through said digital communication line at said first data signaling rate and eighth modem means for transmitting and receiving facsimile control data at said second data signaling rate in one facsimile call;
   wherein at least one of said first and second digital terminal stations includes memory means for temporarily storing a predetermined length of a leading portion of the received series of facsimile message data and control means for initiating the transmission of said facsimile message data after storing said portion.

5. A communication system according to claim 4 wherein said communication system further comprises a third and fourth analog communication line and a third and fourth facsimile apparatus respectively connected to said first and second digital terminal stations by said third and fourth analog communication line, said first and second digital terminal stations further having first and second multiplexing means for respectively multiplexing and demultiplexing a plurality of data signals to be transmitted from said first and third facsimile apparatus to said second and fourth facsimile apparatus, respectively.

6. A communication system according to claim 5 wherein said first and second multiplexing means is a packet multiplexer.

7. A communication system according to claim 5 wherein said first and second multiplexing means is a time division multiplexer.

* * * * *